United States Patent [19]

Wulff et al.

[11] 4,127,730

[45] Nov. 28, 1978

[54] METHOD OF PREPARING POLYMERS ANALOGOUS TO ENZYMES

[75] Inventors: Günter Wulff, Bonn; Ali Sarhan, Ollheim, both of Germany

[73] Assignee: Dynamit Nobel Aktiengesellschaft, Troisdorf, Germany

[21] Appl. No.: 885,235

[22] Filed: Mar. 10, 1978

Related U.S. Application Data

[60] Division of Ser. No. 568,639, Apr. 16, 1975, which is a continuation-in-part of Ser. No. 390,824, Aug. 23, 1973.

[30] Foreign Application Priority Data

Aug. 31, 1972 [DE] Fed. Rep. of Germany ....... 2242796

[51] Int. Cl.² ............................................. C08V 9/26
[52] U.S. Cl. ............................... 560/186; 204/159.15; 204/159.23; 210/510; 260/17.4 SG; 260/17.4 UC; 260/602; 260/862; 260/462 C; 568/868; 521/63; 521/152; 521/142; 521/181; 521/147; 521/149; 562/402
[58] Field of Search .......................... 260/535 R, 602; 560/186; 568/868

[56] References Cited

U.S. PATENT DOCUMENTS

| | | | |
|---|---|---|---|
| 3,594,333 | 7/1971 | Buss et al. | 260/2.5 B |
| 3,627,708 | 12/1971 | Morse et al. | 260/2.5 B |
| 3,681,269 | 8/1972 | Heitz et al. | 260/2.5 B |
| 3,948,821 | 4/1976 | de Benneville | 260/2.5 B |
| 3,957,741 | 5/1976 | Reinbaum et al. | 260/2.5 B |

*Primary Examiner*—Morton Foelak
*Attorney, Agent, or Firm*—Sprung, Felfe, Horn, Lynch & Kramer

[57] ABSTRACT

A non-swellable three-dimensional polymer having a component which is a residue of an optically active compound, which residue is chemically removable from said polymer to leave behind in the physical structure of said polymer a void corresponding to the size and shape of said residue of optically active compound, and a particular steric arrangement of functional groups within the void of said polymer corresponding to the chemical structure of said residue of optically active compound, the original polymer having recurring units of the formulas

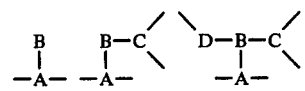

wherein A, C and D are residues bonded to B of compounds which residues are polymerizable or polycondensable and B is a residue of an optically active compound; a process for preparing such polymer and the form of such polymer containing such void and free of the residue of optically active compounds. Analogously the residue B can be an achiral component, the original polymer having recurring units of the formulas

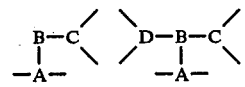

wherein A, C and D are residues bounded to B of compounds which residues are polymerizable or polycondensable and B is a residue of a polyfunctional, achiral compound.

5 Claims, No Drawings

METHOD OF PREPARING POLYMERS ANALOGOUS TO ENZYMES

This is a division of application Ser. No. 568,639 filed Apr. 16, 1975, which is a continuation-in-part of Ser. No. 390,824 filed Aug. 23, 1973.

BACKGROUND OF THE INVENTION

1. Field of the Invention

This invention is directed to preparing polymers containing in the polymeric structure a residue of an optically active compound which residue can be removed from the resultant polymer whereby to provide polymers which in their physical structure have a void or cavity corresponding to the size and shape of the optically active residue removed therefrom. The polymers containing functional groups in a definite three-dimensional arrangement externally at their boundary surface are in cavities.

Such polymers can be used in the shape and size selective absorption of optically active antipodes and in specific interactions through the functional groups with those of the optically active antipodes, i.e., in the racemization of racemates into their optically active forms. This invention is also directed to the use of such new polymeric forms containing a void of size and shape corresponding to an optically active chemical compound for the racemization of racemates. This invention also includes polymers prepared with the use of a polyfunctional, achiral matrix molecule, that can be removed from the polymer, whereby to provide polymers containing functional groups in a definite three dimensional arrangement in cavities. They can be used in specific adsorption and interaction with molecules, whose residues and functional groups correspond to the size and shape of the void and to the functional groups therein. In this way it is possible to achieve separations of otherwise difficulty separable mixtures. The present invention can be considered to be directed to a method of preparing polymers which polymers can be considered to be analogous to enzymes.

2. Discussion of the Prior Art

In enzymes, which are to be considered as biopolymers, the functional groups responsible for interaction with a substrate or receptor are located at quite different points on the peptide chain of the macromolecule and are brought into spatial proximity only by the specific folding of the chain. In the transfer of information these functional groups interact with the corresponding parts of a substrate and thus produce the activity of a reaction of this substrate. Since the spatial arrangement of the peptide chain determines the proximity of the functional groups, the desired information cannot be transferred bi-dimensionally as is the case in certain hormones, but is performed tridimensionally at those points at which the functional groups in the space come into proximity.

A number of attempts have been made to produce synthetic enzyme analogs by copolymerizing a plurality of monomers containing different functional groups, thereby obtaining polymers in which the functional groups are randomly distributed in space and the proximity of two different groups occurs only on a purely fortuitous basis. This imperfect proximity relationship of the functional groups in the synthetic enzymes prepared hitherto may also be held responsible for their comparatively poor catalytic activity, so that these compounds can be evaluated as enzyme models to no more than a limited degree.

Polymers are also known which contain optically active compounds in the molecule. For example, L-lysine hydrochloride has been polycondensed with aromatic or aliphatic dicarboxylic acid chlorides to form polymers (cf. J. Pol.Sc. A-1, 9 (1971), pp. 2413 et seq.). In these polymers, however, the optically active substance is permanently built into the macromolecule and cannot be split off from it again. Furthermore, this procedure does not assure a steric, three-dimensional proximity relationship of functional groups.

The following conditions must accordingly be taken into consideration in preparing polymers analogous to enzymes:

1. The polymer must have several different functional groups.
2. The functional groups must not be randomly distributed in space but must be in suitable proximity to one another.
3. The proximity of the functional groups should be not only bidimensional but also tridimensional.
4. The polymer obtained should be able to enter into specific interaction with substrates.

It is heretofore known that racemates can be resolved into their optically active forms. It has also been proposed heretofore to utilize polymers of optically active groups either in the main chain of the polymer or grafted onto side chains, or, in the case of acids or bases, bonded to ion exchangers by means of electrostatic interactions. These polymers have been used to resolve racemates into their opticaly active forms. The best effects which have been achieved with polymers containing grafted chiral groups. However, the resolving factor in the resolution of DL-mandelic acid on chloromethylated polystyrene grafted with optically active amines was only 1.004 (See Journal of Organic Chemistry, Vol. 31, p. 561 (1966)).

It therefore became desirable to provide an effective means for the resolution of optically active compounds utilizing polymers. More especially, it became desirable to provide a size and shape selective molecular absorbent which would preferentially interact with one optically active form of a given compound from its opposed rotatory form. For instance, it became desirable to provide a sized and shaped molecular absorbent which would preferentially absorb a dextro or levo rotatory form in preference to the other optically active form, i.e., the remaining optical isomer.

SUMMARY OF THE INVENTION

The long felt desideratum in the art has been fulfilled by a three-dimensional non-swellable polymer material comprising a polymer of an olefinic unsaturated compound or polycondensation polymer or polyaddition polymer having in its physical configuration, a void whose size and shape correspond to the size and shape of an optically active compound and which functional groups have a particular steric arrangement within the void, said polymer material being operative to preferentially absorb and interact with the residue of an optically active compound whose residue and functional groups correspond to the size and shape of the void and to the functional groups in the configuration of the polymer when a racemate thereof is passed over the polymer material.

Also, in accordance with this invention, there is provided a polymer which is an intermediate to the polymer containing the specified sized and shaped void and the functional groups. The primary polymer is a non-swellable, three-dimensional polymer having a component which is a residue of an optically active compound which residue is chemically removable from said polymer to leave behind in the physical structure of said polymer a void corresponding to the size and shape of said residue of optically active compound, said polymer having recurring units of the formula

wherein A is a residue bonded to B of a compound which residue is polymerizable or polycondensable and B is a residue of an optically active compound.

The present invention further contemplates a method of preparing such primary polymer which comprises heating a monomer of A-B at a temperature sufficient to effect polymerization of A while the B component remains bonded thereto for a period of time sufficient to effect the polymerization to a polymer having at least two repeating units.

By such process, there is produced the above-described non-swellable, three-dimensional polymer having the residue of an optically active compound therein. This residue of optically active compound can be considered as a matrix for due to its specific molecular geometry and the position of its functional groups in turn determining its optical behavior, the residue serves as a directing medium which affects the physical geometry of the polymer so prepared. Thus, when this residue or matrix is removed the physical components of the polymer remain physically oriented as if the residue of optically active material were still present therein. Thus the void that remains when the residue is removed conforms to the size and shape of the so-removed residue. In other words, the polymer structure does not undergo substantially physical change upon removing of the optically active residue.

Such polymer, in its void form, can be employed as a size and shape selective molecular absorbent. For instance, a racemate having an optically active component corresponding to the size and shape of the void can be passed over the non-swellable void containing polymer and the optical antipode whose size and shape correspond to such void is absorbed preferentially to leave behind the racemic mixture and the opposite optical isomer.

Polymers of the present invention are initially prepared from a monomer or mixture of monomers wherein one component is an optically active compound or a residue of such compound. Preferably, this compound is a polyfunctional compound as will be further explained below. The other component of the mixture of monomers is a residue or compound of a polymerizable or polycondensable material. This latter component can be joined to the residue of optically active forms through a function other than the function accounting for its ability to polymerize or polycondense. When such monomer is subjected to polymerization there is prepared a material wherein the polymeric units are determined by the nature of the polymerizable, polycondensible monomer component.

As indicated above, it is preferred that the optically active form is polyfunctional. Stated differently, it is desired that the optically active form is bonded to a second, a third or a fourth residue which residues are also polymerizable or polycondensable. The bonding of the optically active form to the additional residues are at a function which does not affect the ability of the second residue to undergo polymerization or polycondensation or polyaddition. Accordingly, the components of the monomer to be polymerized can be thought of as having the following generic formulas:

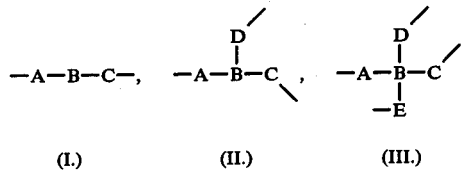

wherein A is a residue of a compound which is polymerizable or polycondensable; B is a residue of an optically active compound; and C, D and E are residues of other (or second) compounds which are polymerizable or polycondensable. Such a monomer is polymerized under conditions where there is formed a three-dimensional polymeric structure which can have cavities and can be macroporous. It will be realized that inasmuch as component B. the residue of the optically active compound, functions as a matrix, its subsequent removal from the so-formed polymer will leave behind a void corresponding to its physical shape and size. Since component B is polyfunctional and optically active, the linkages between the A, C, D and E components are positioned in response to the physical state of such polymeric components. The entire polymer therefore has a removable core of optically active component. The so-formed polymers therefore are analogous to enzymes and have a given arrangement of functional groups contained therein. In other words, there is a particular steric arrangement of functional groups within the polymeric mass dictated by the size and shape of the optically active component. The polyfunctional matrix molecule can also be an achiral one. In this case the monomer to be polymerized can be thought of as having the above formulas I., II., III., too, wherein A, C, D and E are residues of compounds which are polymerizable or polycondensable and B is a residue of an achiral, polyfunctional compound. After the removal of this achiral matrix molecule from the three dimensional non-swellable polymer of said monomers it will leave behind a void corresponding to its physical shape and size. Within the void there is a particular steric arrangement of functional groups within the polymeric mass dictated by the size and shape of the achiral polyfunctional component. For example the distance of two functional groups within the void of the polymer can be varied by variation of the distance of the function groups in the matrix molecule.

The optically active or achiral monomer contains one or more functional groups linked by 1, 2 or more functional groups to polymerizable or polycondensable compounds. Preferably, the optically active or achiral compound is joined to the A, C, D and E residues by linkages which can be easily split to yield to polymer in its optically active or achiral void form. Thus, the optically active or achiral compound can be joined to the polymerizable or polycondensable residues by any one of the following functions: the carboxyl, carbonyl, sulfonic acid, boric acid, phosphonic acid, amino, imino, acylamino, nitro, alkoxy, hydroxy, mercapto, phosphoric acid mono- and diesters, $C_1$ to $C_8$ - alkylamino- or ammonium-, hydroxyl amino- or hydrazino.

Additionally, the optically active or achiral compound can be joined to the A, C, D or E functions by bridges such as present in polycyclic aromates, compounds which form a hydrogen bridge, compounds which have dipol interactions, compounds which have electrostatic interactions, compounds which have hydrophobic interactions, compounds which form complexes and compounds which contain charge transfer complexes. Examples of these latter types of linkages include the following: Interactions between chinone and hydrochinone, between two or more $C_5$-to $C_{25}$-alkylchains; between tetraalkylammonium bases and carboxylic acids, between the ether-oxygen and carboxylic acids, between amino-, imino- or amido- groups and carbonyl groups, between trinitrobenzene and methoxybenzene; between two anthracene moieties.

As indicated above, residues A, C, D and E contain functions which permit polymerization or polycondensation or polyaddition at such functions. These functions are apart from those involved in the joining of the residue itself to the optically active or achiral residue. Preferably, the polymerizable compound contains a polymerizable olefin double bond. It may also, however, contain other polymerizable or polycondensable groups from which polymers can be prepared such as polyacrylates, polyesters, polyurethanes, polyamides, phenolic polymers such as phenol formaldehyde and urea polymers such as urea formaldehyde resins and derivatives thereof, including derivatives containing furfural and furfuryl alcohol.

The present invention has a wide variety of components which can be employed in the preparation of the corresponding polymer. There is set forth herebelow a table showing the types of residues which can be utilized. Although the table shows residues in each column, each component

TABLE

| A | B | C | D |
|---|---|---|---|
| | | sugars | |
| p-vinyl-phenyl-boronic acid | mannitol | p-vinyl-phenyl-boronic acid | p-vinyl-phenyl-boronic acid |
| indene-6-boronic acid | methyl-d-D-manno-pyranoside (glucose) (galactose, etc) | indene-6-boronic acid | — |
| | | amino acids | |
| p-vinyl-aniline | phenylalanine (alanine) (tryptophan) | p-vinyl-benzaldehyde | — |
| p-vinyl-aniline | tyrosin (serine) (cystine) | p-vinyl-benzaldehyde | p-dimethyl-amino-styrol |
| p-vinyl-aniline | dopa | p-vinyl-benzaldehyde | indene-6-boronic acid |
| | | acids | |
| acrylamine | tartaric acid | p-vinyl-phenyl-boronic acid | acrylamine |
| p-vinyl-aniline | tartaric acid-mono-n-octyl-ester | p-vinyl-phenyl-boronic acid | dodecene-1 |
| salicylic acid | mandelic acid | p-hydroxy aniline | formaldehyde*) |
| | | terpens | |
| O,p-dicyanato-benzoic acid | borneol | — | ethylenediamine*) |
| | | steroids | |
| 2,4-dicyanato-toluene-6-sulfonic acid | oestradiol | — | butanediol-1,4,*) glycerine*) |
| | | amines | |
| isophthalic acid-m-sulfonic acid | α-phenylethyl amine | — | ethylenediamine*) |
| | | alkaloids | |
| p-vinyl-aniline | desmethyl- ⎫ ⎬ xx cocaine ⎭ | methacrylic acid | — |
| | | achiral matrix molecules | |
| p-aminomethyl-styrene | 4,4'-adipic acid | p-aminomethyl-styrene | — |
| p-aminomethyl-styrene | tricarballylic acid | p-aminomethyl styrene | p-aminomethyl styrene |
| methacrylic acid | 1,6 hexanediol | methacrylic acid | — |
| methacrylic acid | p-amino-capronic acid | p-aminomethyl styrene | — |

A = a residue bonded to B of a compound which residue is polymerizable or polycondensable
B = a residue of an optically active or achiral compound
C and D = hydrogen or a residue of a group, bonded to B, which residue contains a polymerizable or polycondensable function
*) = these components are not bonded to B, but react in poly-condensation reactions with A or C in a given column can be joined to any other component in the adjoining column. Thus the table is not to be read as implying that only those residues on a single horizontal line can be joined to residues on the same horizontal line.

Polymerization is effective by charging the monomer or mixture of monomers into a vessel and subjecting it to heat until the polymers thereof are formed. Generally speaking, the polymerization is conducted at a temperature between −80° C and 150° C, preferably between 50 and 120° C for a period of time between 1 and 200 hours. The selection of the temperature and duration of polymerization will depend upon the monomer compounds and the excess and type of polymerization. The polymerization can also be conducted at atmospheric pressures, at subatmospheric pressure and at superatmospheric pressure. The use of a closed vessel providing autogenous pressure is particularly contemplated when superatmospheric pressures are to be employed. The pressures range between 20 and 140 psi.

Sub-atmospheric pressure would normally be between 5 and 300 Torr. The polymers prepared can have a wide range of molecular weights. Generally speaking, the molecular weights will be between 20,000 and the molecular weight of three-dimensional cross-linked polymers, preferably above 500,000. These molecular weights are determined in accordance with the measurement of light-scattering in corresponding polarometers. The polymers will generally have more than 150 repeating units. In such connection it is important to note that if the monomer contains a plurality of polymerizable or polycondensible groups, the resultant polymer will be, at least to a minor extent, crosslinked.

The polymerization can be carried out in the absence of a catalyst merely by subjecting the reaction mixture to the appropriate polymerization parameters. If desired, a catalyst can be used such as e.g. in radical polymerization: azoisobutyro nitrile, dibenzoyl peroxide, potassium persulfate; cumolhydro peroxide, azoiso butyronitrile photochemically iniated; $Fe^{+++}$ and potassium persulfate; in the presence of popcorn polymers; in ionic polymerization: $TiCl_4$, $BF_3$, $H_2SO_4$, alkalimetals butyllithium, sodium - or potassium naphthaline, in insertion polymerization Ziegler-Natta-catalysts, e.g. Al $(Et)_3$ and $TiCl_4$; initiation by ultrasonic waves, UV-, X- and γ-rays.

Inasmuch as the present invention has as its prime object the preparation of a non-soluble three-dimensional polymer, it is particularly desirable to include in the reaction mixture a cross-linking agent. Particularly contemplated cross-linking agents are e.g. for polymerization: divinylbenzene, butandiol diacrylate, glycol dimethacrylate, glycoldivinyl ethers, adipic acid divinylester, allyl-vinyl ethers, unsaturated polyesters; for polycondensation e.g. glycerine, cyanuric acid, phenol, melamine, trichlorosilane, maleinic acid, hexamethylenetetramine, for polyaddition: 2,4,6 tricyanto toluene, glycerine, sorbitol, ethylene tetramine, X- and γ-ray. Generally speaking, the cross-linking agents are employed in an amount between 0.5 and 80 weight percent preferably between 25 and 40-wt. percent based upon the weight of the monomer. Preferably, particularly in the case of polymerization in the presence of a cross-linking agent, the polymerization is effected in the presence of an inert solution. It has been found that a mixture of solvents, one being a good, the other being a poor solvent for the resulting polymer, ideally functions as an inert solvent in the polymerization, according to the invention. The following are particularly contemplated as solvents for the polymerization: acetonitrile, benzene/acetonitrile, ethylacetate/benzene, benzene, cyclohexane/acetonitrile, diethyl ether, diethylether/benzene, dimethylformamide (DMF), DMF/benzene, chlorobenzene, dioxane, chlorobenzene/dioxane, butylacetate, butylacetate/toluene.

After the polymerization, the matrix is to be partially or completely removable from the polymer. The removal is performed with known cleaving agents which dissolve the link to the functional groups so that, on the one hand, the optically active or achiral compounds are formed on the other hand the polymers develop which contain the functional radicals at the points at which the optically active or achiral compound was dissolved out, these radicals being bound to the polymer in the steric configuration predetermined by the matrix. The dissolution of the optically active or achiral compound from the polymer matrix can be performed, for example, by hydrolysis with water, by acid bydrolysis, acid alcoholysis, alkaline hydrolysis, hydrogenation, exchange reactions with low-molecular amines, aldehydes, etc., double-bond cleavage, glycol cleavage, reduction, or oxidation. The particular reaction or reactions chosen depend upon the nature of the linkage to be cleaved. Neutral hydrolysis can be performed using water or mixtures of water with $C_1$- to $C_8$- alcohols or mixtures of water with acetone or other water-soluble solvents at room temperature or at elevated temperatures ranging from 30 to 150° C.

Acid hydrolysis can be employed using a mineral acid or strong organic acid having a pKa of at least 5. Suitable acids include hydrochloric, sulfuric, nitric, phosphoric, trichloroacetic and sulfonic. Acids would generally be used such that the solution has a pH of below 4 and the acid hydrolysis would be conducted for a period of time of between 30 and 5,000 minutes. Acid alcoholysis is performed using alcohol such as a C1 to C8 alcohol, especially methanol, ethanol, normal propanol, isopropanol and butanols. The alcohol would normally contain between 1 and 30 weight percent of an acid having a pKa below 5.

The alkaline hydrolysis would be performed for the same period of time, using an alkaline such as sodium hydroxide, potassium hydroxide and ammonium hydroxide or other alkaline agent of pKb of below 5. The solution will generally have a pH above 9.

Hydrogenation is performed using hydrogen gas or a source of hydrogen, preferably in the presence of a catalyst such as a noble metal containing catalyst, particularly a platinum or palladium catalyst. It is usually performed at an elevated temperature between 50 and 120° C for a period of time between 20 and 1,000 minutes.

The exchange reactions may be carried out employing primary, secondary or tertiary amines, particularly amines of low molecular weight of aliphatic or aromatic compounds. Particularly contemplated are analine and the primary and secondary amines of C1 to C8 alkanes.

In lieu of the amines of these organic compounds, an aldehyde can be employed such as propionaldehyde, formaldehyde or acetaldehyde. The methods for double bond cleavage, glycol cleavage, reduction or oxidation are per se generally known in respect of the cleavage of non-steriospecific compounds. For instance, oxidation can be carried out employing an oxygen-containing salt such as a permanganate, dromate or vanadate or a source of oxygen gas. An oxidaton catalyst is preferably employed. This reaction is normally carried out at an elevated temperature under pressure. Reduction, on the other hand, is carried out utilizing a reducing agent such as a lithium containing compound.

It is decisively important that the polymer that forms be insoluble or unswellable in most solvents, or that the arrangement of the chains be made immutable by other measures. The polymer is to permit good access to as many functiona groups as possible. The polymer is insoluble, or sparingly soluble, at 25° C in the following materials: benzene, acetonotrile, cyclohexane, water, chloroforme, acetone, ethylacetate, toluene, DNF, dimethyl sulfoxide, dioxane, diethyl ethers, glycol, etc. By "insoluble or sparingly soluble" is meant that less than 5%, preferably less than 0.1%, by weight of polymer is soluble in one (1) liter of solvent as 25° C.

These requirements are extensively fulfilled by constructing the polymer in a macroporous form. For example, by the choice of a suitable bifunctional crosslinking agent it is possible to control the porosity during the polymerization and obtain suitable cavities in the polymer. Also, the nature of the inert solvent in whose presence the polymerization takes place, and the quantity thereof and of the cross-linking agent affect the porosity and the non-swellability. A mixture of a good solvent with a poor solvent has proven to be a good inert solvent for the polymerization reaction.

The porosity of the polymer is desirable so that the greatest possible percentage of the matrix molecule will be able to be dissolved out of the polymer, and so that the greatest possible number of functional groups possibly exercising an enzymatic action will be present in the macromolecule at an easily accessible point.

The majority of pore diameters range from 50–1000 Å, preferably from 200–400 Å as measured by Hg-porosimetry. The specific inner surface area as measured by the BET-method ranges from 50–500 m$^2$/g, preferably from 150–250 m$^2$/g. The non-swellability of the polymer is necessary to the immutability of the spatial fixation of the functional groups in the macromolecule.

The swellability in solvents those shall be used as reaction medium or chromatographic mobile phase with these polymers does not exceed 10%, preferably it is less than 5%. The swellability can easily be measureably the volume enlargement of the polymer in calibrated tubes filled with this solvent or by gravimetric determination of the solvent uptake in the appropriate solvent. The glass transition state as measured by differential thermal analysis is at temperature considerably higher than the temperature, where the polymers are to be used. Preferably it is higher than 100° C.

These bifunctional compounds can be used preferentially as cross-linking agents which form copolymers with the copolymerizable groups of the molecule linked to the matrix. If possible, the cross-linking agent will have the same polymerizable groups as the entire monomeric molecule of the matrix. Thus, divinylbenzene or glycoldimethacrylate are suitable as cross-linking agents when the monomeric matrix molecule contains olefinic double bonds.

The polymers prepared in accordance with the present invention are suitable, on the basis of their above-described properties, as catalysts whose mode of action corresponds to that of enzymes. For example, compounds of complex construction, whose synthesis by conventional methods is impossible or is possible only at extreme cost, can be made in a simple and stereochemically uniform manner. Their effectiveness, in contrast to enzymes, is fully sustained even in non-aqueous systems and at elevated temperature.

Polymers prepared with optically active matrix molecules in accordance with the invention can be employed to separate racemates into the corresponding optically active compounds. The racemate to be separated can also serve, in the form of the one optically active form, as a matrix for the preparation of the polymer. The separation can be performed most simply, for example, by dissolving the racemate in a non-solvent for the polymer, mixing it with the polymer and stirring. The polymer is then removed by filtration, and the opposite optically active form of the matrix remains concentrated in the filtrate.

The other optically active form remaining in the polymer and bound by esterification or electrostatic bond or by a Schiff base or by charge transfer complex or by hydrophobic interaction or by complex formation can be dissolved out of the polymer again in the same manner as in the preparation of the polymer or in some other manner, preferably the bonding to the polymer is of an easy reversible type. Substantially greater concentrations along with automatic performance of the proc ess can be achieved by separation in columns. In this manner, too, derivatives of the matrix serving as an optically active compound or compounds of similar construction can be separated into their optically active forms by means of the polymer prepared with this matrix.

This method of resolving racemates differs from all other known methods of racemate resolution in that it is based on an entirely novel principle: compounds with asymmetrical carbon atoms are not required in the polymer in the resolving process, and instead the resolution takes place in cavities which are asymmetrical due to functional groups, steric delimitations or hydrophobic interactions playing an additional part. The enrichment of one optically active form can be on one theoretical plate between 1 and 10 percent. But also the resolving factor $\alpha$ that is, the ratio of the distribution coefficients between the polymer and the solution of the D and L form, which permits a much more precise conception of the separating action of a racemate resolving method than data on the concentration, is much higher than in the methods of the prior art. For DL-glyceric acid, for example, the resolving factor was found to be $\alpha = 1.036$, and for DL-glyceric acid methyl ester it was found to be $\alpha = 1.012$, when a polyvinyl compound was used as the polymer in accordance with the invention. Such polyvinyl compound was prepared by means of D-glyceric acid as the matrix, the linking of the D-glyceric acid to the vinyl groups having been performed by means of an

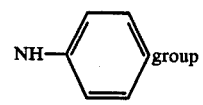

on the one hand and through a phenylboric acid ester group on the other.

The starting products for the polymers of the invention are prepared by methods of the prior art. If an optically active dihydroxycarboxylic acid is selected, for example, as the matrix, the linking to the polymerizable compounds can be performed on the one hand through an acid amide grouping—e.g., through reaction with a vinylaniline—and on the other hand through an easily split-off ester grouping—e.g., by reaction with a substituted boric acid ester such as vinylboroxine. In the following example, to which the invention is not limited, the preparation of a corresponding polymer is described.

EXAMPLE 1

(1) Preparation of D-glyceric acid-(p-vinylanilide)-2,3-O-(p-vinylphenylboronate) as the monomer to be polymerized.

Preparation of the Monomer

The preparation of this monomer is performed in four steps, setting out from D-glyceric acid methyl ester. In the first step, 18 g of this ester is refluxed with 60 ml of acetone and 0.4 g of p-toluenesulfonic acid in 800 ml of methylene chloride with a Vigreux column (30 cm) onthe water separator untl no more water of reaction is formed. Then the mixture is cooled, carefully washed with a solution of 1 g of potassium hydroxide in 60 ml of water, then washed twice with 50 ml of water each time, dried with potassium carbonate and distilled first at normal pressure and then with a vacuum. 2,3-O-isopropylidene-D-glyceric acid methyl ester is a colorless, very fluid liquid with a characteristic ester odor. Boiling point at 12 mm: 77° C Yield: 19.8 g (82.5% of the theory); $[\alpha]_D^{20} = +7.95°$ ($c = 1.12$; acetone).

Elemental analysis: $C_7H_{12}O_4$ (1602): Calc.: C 52.49; H 7.55; Found: C 51.83; H 7.51

In a second step, the 2,3-O-isopropylidene-D-glyceric acid (p-vinylanilide) is prepared from this compound. The procedure is as follows.

Into a Grignard reagent solution cooled to 0° C and composed of 5.2 g of magnesium and 30.2 g of methyl iodide in 100 ml of anhydrous ether a solution of 23.8 g of p-aminostyrene and 0.5 g of tert.-butylcatechol in 100 ml of water-free tetrahydrofurane is slowly added, drop by drop, over a period of 20 minutes and a temperature below 10° C. Then the mixture is warmed to 45° C and a solution of 16 g of 2,3-O-iso-propylidene-D-glyceric acid methyl ester in 100 ml of anhydrous tetrahydrofurane is dripped in at such a rate that the temperature does not exceed 45° C. After that it is heated with refluxing and stirring for another hour on the water bath, cooled, and hydrolyzed by the addition of 100 g of crushed ice, and then enough 2N hydrochloric acid is added so that the precipitate that has formed barely dissolves. The organic stratum is separated and the aqueous phase is extracted twice with ether and the combined extracts, cooled to 0° C, are washed twice with 80 ml of 2N ice-cooled hydrochloric acid each time, and once with 80 ml of ice-cooled water. After drying over potassium carbonate, the solvent is removed by distillation on the rotary evaporator, the residue is dissolved in boiling petroleum ether (40°-60°), and allowed to crystallize first at room temperature and then at −20°. 2,3-O-isopropylidene-D-glyceric acid-(p-vinylanilide) crystallizes in fine, colorless needles.

M.P. 76°; $[\alpha]_D^{20} = +32°$: ($c = 1.06$; acetone); yield: 20.9 g (89% of the theory).

Elemental analysis: $C_{14}H_{17}NO_3$ (247.3) calc.: C 67.99; H 6.93; N 5.66; found: C 67.90; H 6.95;

In the third reaction step the isopropylidene groups are first split off and then reacted with p-vinylphenylboric acid. For this cleavage, 13 g of 2,3-O-isopropylidene-D-glyceric acid-(p-vinylanilide) is heated under nitrogen, with stirring, at 80°, with a mixture of 13 g of acid ion exchanger, 300 ml doxane and 300 ml distilled water. The acetone that forms is removed from the equilibrium by the introduction of a weak current of nitrogen. The reaction was pursued by means of thin-layer chromatography using silica gel, and had ended after 3 hours. The mixture was allowed to cool under $N_2$, filtered from the ion exchanger, and washed with a small amount of dioxane. The slvent was reduced to about 80 ml at 30° on the rotary evaporator. The remainder was placed in the refrigerator until complete crystallization had taken place, and then was filtered. After drying in the vacuum exsiccator, 10.4 g of raw product (95% of the theory) was obtained. After one recrystallization from chloroform, 9.4 g (86% of the theory) of chromatographically pure substance was isolated. M.P. 137° $[\alpha]_D^{20} = +59.2°$ ($c = 1.26$: acetone)

Elemental analysis: $C_{11}H_{13}NO_3$ (207.2): Calculated: C 63.76; H 6.30; N 6.76; Found: C 63.30; H 6.15; N 6.95 0.05 -

Alternatively D-glyceric acid -(p-vinylanilide) can be prepared directly from D-glyceric acid and p-aminostyrene on treatment with N,N'-dicyclohexylcarbodiimide as condensing agent: To a solution (cooled to 0° C) of 5.3 g (0.05 mole) D-glyceric acid in 150 ml of acetonitrile, there was added 8.9 g (0.075 mole) β aminostyrene and 10.3 g (0.05 mole) N.N'-dicyclohexylcarbodiimide. A precipitate of N.N'-dicyclohexylurea is formed immediately, but the reaction was allowed to proceed for 15 hours at room temperature. After filtration and removal of the acetonitrile by distillation under reduced pressure, the residue was taken up in ethyl acetate and extracted with HCl, bicarbonate and water. After drying and removal of the solvent the residue was crystalized from chloroform, yielding 7.5 g (73%), m.p. 135 - 136° C.

For the preparation of the D-glycericacid-(p-vinylanilide)-2,3-0-(p-vinylphenylboronate), 9.2 g of D-glycericacid-(p-vinylanilide), 5.8 g of trip(p-vinylphenyl)boroxine (prepared by dehydrating p-vinylphenylboric acid in toluene) and 100 mg of tert.-butylcathechol were boiled under nitrogen in 600 ml of water-free benzene in a one-liter flask provided with a water separator. After no more water droplets were separated the solvent was removed on the rotary evaporator. The residue was extracted three times with 700 ml of boiling petroleum ether (60–95°) each time. The petroleum ether extracts were removed by filtration while hot. Upon cooling, first at room temperature, then at −20°, the product crystallizes as a voluminous precipitate. D-glycericacid-(p-vinylanilide)-2,3-O-(p-vinylphenylboronate) is a white crystalline powder. Yield: 10 g (71.4% of the theory)

M.P. 143 to 145° C; $[\alpha]_D = +176.6$ ($c = 0.945$; water-free dioxane)

Elemental analysis: $C_{19}H_{18}BNO_3$ (319.2): Calculated: C 71.49; H 5.68; B 3.39; N 4.39; Found: C 71.55; H 5.64; B 3.47; N 4.48

(2) Preparation of the Polymer a) General Procedure

The homogeneous polymerization mixture is delivered through a funnel with a long stem into a thick-walled bomb tube. Then the tube is cooled with the exclusion of moisture in a mixture of dry ice and methanol and filled with nitrogen by evacuating it carefully several times and letting raw nitrogen be drawn into it. Then the tube is drawn to a thick-walled tip and sealed shut in an oxygen-fed flame, and the seal is then cautiously and slowly cooled. Then the tube is carefully wrapped in a cloth and placed in an oven (in the metal container in the drying oven). The oven is heated at 60, 80, 100 and 120° for 24 hours at each temperature. Then the tube is chilled in a dry ice and methanol mixture and the tube is opened by cautiously breaking it. The polymer obtained is coarsely crushed and dried in vacuo at 40°. Then it is coarsely ground and repeatedly washed with ether. Then it is dried again and by frequent sifting and grinding a maximum percentage is obtained of the grain size of 63 to 125 microns. The sifted polymer is again washed with ether and again dried.

(b) Preparation of Polymerization Mixture I (P-I).

10 g of D-glycericacid-(p-vinylanilide)-2,3-0-(p-vinylphenylboronate), 46.5 g (51.3 ml) of a mixture of about 55% divinylbenzene-isomer mixture, about 35% ethylvinylbenzene and small amounts of diethylbenzene, 60 ml of water-free acetonitrile and 355 mg of azoisobutyronitrile (AIBN) are polymerized as described above after being divided into 3 ampoules of a capacity of about 100 ml.

6.94 g of polymerization mixture P-I are heated at 70° together with 40 ml of 20% HCl in methanol for 16 hours under nitrogen. Then the mixture is filtered and thoroughly washed with methanol.

In order to free the polymer thus produced (P-Ia) of any HCl that may still be bound to it, it is stirred with a solution of 1 g of $NaHCO_3$ in 100 ml of a 1:1 mixture of methanol and water for several hours, filtered, and washed thoroughly with $MeOH/H_2O$ (1:1). To eliminate the last traces of soluble components, P-Ia is placed in a column and eluted first with 400 ml of the MeOH/$H_2O$ (1:1), then with 400 ml $H_2O$ and finally with 200 ml of acetonitrile. Then the polymer is dried in vacuo at about 40°.

This polymer has the following physical data:
Specific surface area: 83 m²/g (by the BET-methode)
  porosity: main pore volume at 350 Å pore diameter (by Hg-porosimetry)
  volume swellability: 5% in acetonitrile (measured in calibrated tubes)
glass transition state: approximately 05° C (3) Resolution of Racemates (a) Resolution of DL-glyceric acid: 207.2 mg DL-glyceric acid were dissolved in 45 ml of water-free acetonitrile and stirred for 18 hours with 4.5 g of Polymer Ia. Then the solution is filtered and the residue is washed four times with 10 ml of water-free acetonitrile each time.

To determine the absorption capacity, the polymer thus obtained (hereinafter referred to as P-Ib) is then dried in the vacuum drying oven at about 40° and then it is stirred with 10 ml of methanol-water mixture (1:1) for 6 hours in batches of 50 to 100 mg. Then the polymer is filtered out, washed with water, and the methanol is removed in vacuo. The aqueous solution is then titrated in the customary manner (of. Table 3).

Table 3

| No. | P-Ib(mg) | Consumption of 0.025N $NaIO_4$ (ml) | Cleavage rate* (in %) | Absorption capacity in mg glyceric acid per g of P-Ia |
|---|---|---|---|---|
| 1 | 89.2 | 1.00 | 19.2 | 14.95 |
| 2 | 63.6 | 0.71 | 19.0 | 14.90 |

*The cleavage rate relates to the entire equivalent amount of glyceric acid in P-Ia.

A total, therefore, of 14.925 × 4.5 = 67 mg of glyceric acid had been absorbed by 4.5 g of P-Ia. In the filtrate there still remains 207.2 − 67 = 140.2 mg of glyceric acid in the DL and L forms. All of the acetonitrile is distilled out in vacuo to dryness. The residue is dissolved in 10 ml of methanol-water mixture (10:1) and, at room temperature, with shaking, a solution of diazomethane in ether is added until a faint yellow color persists. The solvent is removed in vacuo and the glyceric acid methyl ester enriched with the L form is obtained in a virtually quantitative yield. The optical rotation in 2 ml dioxane amounts to $\alpha_D^{20} = -0.004$ to 0.005°. For further identification the glyceric acid methyl ester is transformed by reaction with triphenylboroxine in dioxane to the triphenylboroxine derivative which has an optical rotation of $\alpha_D^{20} = -0.033$ in 2 ml dioxane. This derivative is then reacted in a prior-art manner to form glycericacidmethylester-2,3-0-di(p-nitrobenzoate). This product, purified by means of a chromatography column, has an optical rotation of $\alpha_D^{20} = +0.042$ (c = 22.1; dioxane).

On the basis of this figure the concentration $C_1$ of the pure L form may be computed:

$$C_1 = 4.2/34.9 = 0.12 \text{ g per 100 ml.}$$

The enrichment of the L form in the filtrate is thus:

$$A_l = (C_L/C) \cdot 100 = (0.12/22.1) \cdot 100 = 0.55\%.$$

The enrichment of the D form in the polymer, $A_D$, may be calculated in advance by multiplying $A_L$ by a factor F, F being the total amount of glyceric acid in the filtrate, divided by the total amount of glyceric acid on the polymer.

$$A_D = A_L \cdot F = 0.55 \cdot (140.2/67) = 1.15\%.$$

The resolving factor $\alpha$ is equal to $\alpha_L$ divided by $\alpha_D$, $\alpha_L$ being the total amount of L in the filtrate divided by the total amount of L on the polymer, and $\alpha_D$ being the total amount of D in the filtrate divided by the total amount of D on the polymer:

$$\alpha = (50.275/49.425) \cdot (50.575/49.725) = 1.034.$$

In order to split off the glyceric acid adsorbed by the polymer, P-Ib is placed in a column and eluted with about 500 ml of methanol-water mixture (1:1). After eliminating the solvent by evaporation, the polymer is transformed, as described above, first to the methyl ester and then to the di-(p-nitrobenzoate) derivative. The optical rotation of the methyl ester was measured in about 1.4 ml of dioxane and amounted to $\alpha_D(20 = +0.005°$.

From the glycericacidmethylester-2,3,0-di(p-nitrobeazoate) 96 mg was isolated: $\alpha_D^{20} = -0.015°$ (C = 4.8 dioxane)

, $C_D = 1.5/34.9 = 0.043$ g per 100 ml;
, $A_D = 0.043/4.8 \cdot 100 = 0.9\%$ (1.15% had been calculated in advance).

(b) Resolution of DL-glyceric acid methyl ester
(a) 235.9 mg of DL glyceric acid methyl ester was reacted with 4 g of polymer P-Ia by the same procedure as with the glyceric acid.

Table 5 shows the cleavage rate of the polymer obtained (P-Id) and the absorption capacity of P-Ia for glyceric acid methyl ester.

Table 5

| No. | P-Id (mg) | Consumption of 0.25N NaIO$_4$ (ml) | Cleavage rate (%) | Absorption capacity (mg of glyceric acid methyl ester per g of P-Ia) |
|---|---|---|---|---|
| 1 | 188.7 | 1.01 | 18.3 | 16.1 |
| 2 | 110.8 | 0.62 | 19.0 | 16.8 |

In all, therefore, $16.45 \cdot 4 = 65.8$ mg of glyceric acid methyl ester was absorbed by 4 g of P-Ia. In the filtrate there remains $235.9 - 65.8 = 170.1$ mg of glyceric acid methyl ester. The filtrate is concentrated by evaporation until dry. The residue is dissolved in about 1.8 ml of dioxane and the optical rotation is determined: $\alpha_D^{20} = -0.002°$.

Then the phenylborane derivative is prepared from this optically active glyceric acid methyl ester as described above, and it is dissolved in about 1.7 ml. of dioxane and its optical rotation is measured: $\alpha_D^{20} = -0.008°$.

The 2,3,0-di(p-nitrobenzoate) derivative is then prepared and purified in a column. 291 mg of pure product was isolated. $\alpha_D^{20} = +0.010°$ (C = 17.1 dioxane);

, $C_L = 1/34.9 = 0.0287$ g per 100 ml:
, $A_L = 0.0287/17.1 \cdot 100 = 0.168\%$  $D_D = 0.168 \cdot 170.1/65.8 = 0.44\%$
, $\alpha = 50.084/49.78 \cdot 50.22/49.916 = 1.012$ (β) 8.7 g of a once used and again regenerated polymer Ia was reacted as described above with 315 mg of DL-glyceric acid methyl ester in water-free dioxane as solvent.

The cleavage rate of the polymer obtained, as well as the absorption capacity of P-Ia, are identical to the corresponding values in Experiment (α).

The ester in the filtrate was transformed to the phenylboranate derivative, and dissolved in 1.7 ml of dioxane; the optical rotation was then determined : $\alpha_D^{20} = -0.006°$ ; $A_D = 0.15\%$ (estimated).

(γ) 10 g of P-Ia was stirred for several days with dioxane at room temperature, then heated for 6 hours at 80°. The polymer was then dried in vacuo at 40° and reacted in the usual manner with 813 mg of DL-glyceric acid methyl ester. Despite this pre-treatment of the polymer, the absorption capacity was no different than in Experiments (α) or (β); enrichment in the optical antipodes was not found on the basis of this pre-treatment.

(c) Resolution of DL-glycerinaldehyde.

198 mg of DL-glycerinaldehyde is dissolved in 15 ml of water and let stand for 20 hours. Acetonitrile is dripped in under nitrogen and at the same time the acetonitrile-water is removed by azeotropic distillation until the vapor temperature reaches 81.5°. Then 50 ml of water-free acetonitrile is added and the distillation of about 20 ml of solvent continues. After cooling, the mixture is reacted with 4 grams of P-Ia as usual.

Table 6 shows the cleavage rate of the polymer obtained (P-Ia) and the absorption capacity of P-Ia for glycerinaldehyde.

Table 6

| No. | P-Ia in mg | Consumption of NaIO$_4$ in ml | Cleavage Rate % | Absorption cap. in mg glycerinaldehyde per g of P-Ia |
|---|---|---|---|---|
| 1 | 73.4 | 0.76 | 17.7 | 11.7 |
| 2 | 109.7 | 1.16 | 18.2 | 11.9 |

Table 6-continued

Therefore a total of $11.8 \cdot 4 = 47.2$ mg of glycerinaldehyde has been absorbed by 4 g of P-Ia. $198 - 47.2 = 150.8$ mg of glycerinaldehyde remains in the filtrate.

The filtrate is concentrated by evaporation until dry. The concentrate is dissolved in about 1.5 ml of water and reacted with 400 mg of dimedone to form glycerinaldehydedimedone. The raw product is purified through a silica gel column, 42 mg of chromatographically pure product being isolated.

, $\alpha_D^{20} = -0.018°$ (c = 2.1; ethanol)
, $C_L = 1.8/197.5 = 0.0091$ grams per 100 ml;
, $A_L = 0.0091/2,1 \cdot 100 ' 0.43\%$;
, $A_D = 0.43 \cdot 150.8/47.2 = 1.37\%$
, $\alpha = 50.215/49.315 \cdot 50.685/49.785 = 1.036$

EXAMPLE 2

(a) Preparation of D-mannitol-tri-(p-vinylphenylboronate9 as the monomer to be polymerized.

7.25 g of p-vinylphenylboric acid (or 6.4 g of p-vinylphenyloboric acid anhydride) was dissovled in 7.5 ml of methylanol at 50° C. Also, 2.72 g of D-mannitol was dissolved in 4.5 ml of water at 50° C. The mannitol solution was added to the boric acid solution, whereupon a white paste precipitated. This was filtered, washed with methanol-water mixture (2:1) and dissolved in 100 ml of benzene for recrystallization. After the removal of the remaining turbidity the filtrate was concentrated to 50 ml and then 65 ml of petroleum ether was added. The ester precipitated again. This recrystallization was repeated twice; the yield of pure product thus obtained amounted to 5.8 g =75%.

MP = $158 - 160°$ C $[\alpha]_{10}^{436} +144.0°$

Elemental analysis: Found C69.50%; H 5.60%; B 6.28% Calculated: C 69.42%; H 5.70%; B 6.15%

(b) Preparation of the polymer.

Two grams of D-mannitol-tri-(p-vinylphenylboronate) together with 2 ml of methacrylic acid methyl ester, 4 ml of ethylene glycol dimethacrylic acid ester and 100 mg of α,α'-azo-diisobutyronitrile are dissolved in 4 ml of benzene and placed in a bomb tube. Washing is performed portion-wise with another 4 ml of benzene. Then the mixture is washed three times with nitrogen at −70° C and then, after the bomb tube has been sealed, it is heated at temperature between 60 and 120° C. The polymer obtained (P-III) is crushed, freed of solvent in vacuo at 40°, and then ground. The specific surface area was found by the BET method to be 180 m$^2$/g.

In like manner a polymer P-IV) was prepared, in which acetonitrile was used as solvent instead of benzene.

In addition, a polymer P-V was prepared in a manner similar to P-I, 2 ml =2.19 g of indene being used instead of the methacrylic acid ester.

(c) Splitting off the matrix.

2.0 g of a polymer prepared as in (b) was rinsed for 12 hours with a mixture of methanol and water (1:3). After this operation, 79,8% of the D-mannitol contained in the polymer had been split off. Continuing this treatment for an additional 24 hours resulted in a cleavage rate of 86.1%. Then the polymer was rinsed for 36 hours with about 750 ml of a mixture of ethanol and water (8:2) to which 3% glycol had been added, and then it was again washed out with methanol.

(d) Determining the resolving factor.

The resolving factors of polymers freed of the matrix in this manner were determined with respect to DL-mannitol. The following general procedure was used: DL mannitol was brought in contact with the polymer, free of the matrix, in a suspension. After the esterification equilibrium had established itself, filtration was performed, and the amount of the mannitol in the filtrate was determined by the filtration of an aliquot part. The rest was used for determining the optical activity. Titration is used to determine the amount of mannitol in the filtrate $c_F$ and the rotation was used to determine also the quantities of the D and L components $c_{FD}$ and $c_{FL}$. Furthermore, . the portion of the racemate that remained in the polymer was split off from the polymer and $c_p$, $c_{PD}$ and $C_{PL}$ were determined in the same manner.

On the basis of these measurements the resolution factor $\alpha$ was determined for the above-named polymers. The resolution factors given hereinbelow apply on the condition that, in each case, 46 mg of the racemate is brought into contact for a time of 6 hours with the polymer obtained in accordance with (c), at a temperature of 50° C. Under these conditions the resolution factor for polymer III was 1.065, for polymer IV it was 1.083 and for polymer V it was 1.090.

EXAMPLE 3

(1) Preparation of D-mannitol - 1,2; 3,4; 5,6 - tri - 0 - (p-vinylphenylboronate) as the monomer to be polymerized.

Preparation of the Monomer

This monomer is prepared in one step from D-mannitol and p-vinyl-phenyl-boronic acid. 1.82 g D-mannitol are dissolved in 3 ml water at 50° C and 4.83 p-vinyl-phenyl-boronic acid, dissolved in 5 ml methanol at 50° C are added. The product crystallizes immediately as white thick crystals. It is filtered, washed twice with methanol/water 2:1 and dried in a desiccator. The product is dissolved in 50 ml benzene, filtered, evaporated to 25 ml and 25 ml of petrol ether is added. Large white crystals are obtained. M.P. 166° C; $[\alpha]_{436}^{20}$ + 144° (c=1.0, chloroform); Yield 3.9 g (63% of the theory)

Elemental analysis: $C_{30}H_{29}O_6B_3$ (518.0): calc: C 69.50; H 5.60; B 6.28; found: C 69.32; H 5.46; B 6.68.

Preparation of the Polymer 2 g D-mannitol - 1,2; 3,4; 5,6 -tri - 0 -(p-vinylphenylboronate), 12 ml acetonitrile, 4 ml methylmethacrylate 5.3 ml glycoldimethacrylate, and 75 mg azoisobutyronitrile (A I B N) are polymerized as described in example 1. The D-mannitol of the produced polymer is dissolved by treating the polymer in a column at 50° with a mixture of methanol/water 1:1. After eluting with 2 l of solvent during 24 hours more than 80 percent of D-mannitol are removed from the polymer. The polymer shows a good resolving power for the racemate D,L-mannitol. Furthermore one obtains good chromatographic separations between mannitol, sorbitol and dulcitol.

EXAMPLE 4

Preparation of N-(p-vinyl-benzylidene) L-phenylalanine- (p-vinyl-anilide) as the monomer to be polymerized.

Preparation of the Monomer

N-Trifluoroacetyl-L-phenylalanine is dissolved in tetrahydrofuran and treated with p-vinyl-anilinein presence of N,N'dicyclohexyl carbodiimide. N-Trifluoracetyl - L - phenylalanine(p-vinylanilide) is formed in high yield and without racemization. The trifluoroacetyl-residue is removed by hydrolysis with diluted mineral acid at room temperature. L - Phenylalanine (p-vinylanilide) is then treated with p-vinyl-benzaldehyde in methanol at 50° and the Schiffbase is formed in high yields. N-(p-vinylbenzylidene)L-phenylalanine(p-vinylanilide) is a crystalline rather stable compound, but should be stored at −20° and some polymerization inhibitor should be added in order to suppress polymerisation.

Preparation of the Polymer 5 g N-(p-vinyl-benzylidene L-phenylalanine-(p-vinylanilide) 8 ml benzene, 8 ml acetonitrile, 6 ml pure p-divinylbenzene, 5 ml indene, and 200 mg azoisobutyronitrile (A I B N) are polymerized in a sealed tube at room temperature by irridation with U V -light of 254 m$\mu$.

L-Phenylalanine is split off from the produced polymer by heating it at 70° C together with 20% HCl in methanol for 20 hours under nitrogen. Then the mixture is filtered and thoroughly washed with methanol, with a solution of 1 g NaHCO$_3$ in methanol/water 1:1 and with methanol/water 1:1. This polymer when treated with D,L-phenylalanine absorbs preferentially L-phenylalanine, thus giving the possibility for resolution of the racemate.

EXAMPLE 5

Preparation of D-tartaric acid - mono - n - octylester - 2,3 -0-(p-vinyl-phenylboronate)-(p-vinyl-anilide) as the monomer to be polymerized.

Preparation of the Monomer

The tartaric acid - mono - n - octylester is dissolved in tetrahydrofuran and treated with p-vinyl-anilinein presence of N,N'-dicyclohexyl-carbodiimide, D-Tartaric acid - mono - n - octylester (p-vinyl-anilide) is formed in high yields. This product is boiled with tri- (p-vinylphenyl)boroxine in benzene in a flask provided with a water separator. In nearly quantitative yield D-tartaric acid - mono - n - octylester - 2,3 -0- (p-vinyl-phenylboranate)- (p-vinylanilide) is formed.

Preparation of the Polymer 5 g D-tartaric acid - mono - n - octylester - 2,3 - 0 -(p-vinylphenylboronate) - (p-vinyl-anilide), 8 ml cyclohexane, 8 ml ethylacetate, 5 ml dodecene - 1, 6ml pure p-divinylbenzene and 200 mg dibenzoylperoxide are polymerized in a sealed tube at temperatures starting at 50°, to 60°, 70° and 80° during 3 days. D-tartaric acid n-octylester is split off by treating the polymer with 25 percent ammonia in methanol at room temperature for a period of 20 hours. The polymer is washed thoroughly with methanol and methanol/water 1:1. The polymer shows good resolution power for D,L-tartaric acidmono - n - octylester.

EXAMPLE 6

Preparation of isophthalic acid - m - sulfon -(N-D-1-phenylethyl)amide as a monomer to be polycondensated.

Preparation of the Monomer

Isophthalic acid - di - benzylester is sulfonated in tetrachloromethane by introducing gaseous $SO_3$, the reaction is at first cooled by ice, later on it is heated under evaporation of the solvent to 110° C for 2 hours. Isophthalic acid - di - benzylester - m - sulfonic acid is treated with $SO_2Cl_2$ to transform the compound to the sulfonic acid chloride, which then is treated without further purification with D - α - phenylethylamine in pyridine as solvent. The isophthalic - acid - di - benzylester - m-sulfone- (D-α-phenylethylamide) is obtained in good yield. The benzylester groups are split off by catalytic hydrogenation in diethylether in presence of Pt.

Preparation of the Polymer.

Isophthalic acid - m - sulfone (D-α-phenylethylamide) in mixture with trimellitic acid is treated with $SO_2Cl_2$ in presence of some pyridine and thus converted to the acid chlorides. These are dissolved in methylene chloride and under vigorous stirring poured to a solution of ethylendiamine and potassium hydroxide in water. After 20 minutes at room temperature the white amorphous polymer is filtered, thoroughly washed and dried. The D - α - phenylethylamine residues are split off by treating the polymer with 2% HCl in methanol at 50° for 20 hours. The produced polymer shows a good resolving power for D,L - α - phenylethylamine and similar racemic amines.

EXAMPLE 7

Preparation of oestradiol - 3 - o - (2,4 - dicyanato-toluene-6-sulfonate) as a monomer for a polyaddition polymer.

Preparation of the Monomer.

2.4 - Dinitrotoluene is sulfonated with oleum/sulfonic acid, and 2.4 - dinitro-toluene - 6 - sulfonic acid is obtained. The sulfonic acid is transformed to the acid chloride with $SO_2Cl_2$ in presence of some pyridine. The $SO_2Cl_2$ is evaporated and the residue is dissolved in pyridine. Oestron is added and the solution is worked up after 24 hours standing. It is poured into ice water and after 3 hours filtered and washed thoroughly with water. The residue is purified by crystallization. Oestron - 3 - o - (2.4 - dinitro-toluene-6-sulfonate) is hydrogenated in methanol in presence of Pd on charcoal to yield oestradiol - 3 - o - (2.4-diamino-toluene-6-sulfonate). This diamino compound is treated in tetrahydrofuran at 0° C with phosgene, afterwards this treatment is continued at 60 - 70° C. After evaporation of the solvent the residue of oestradiol - 3 - o - (2.4-dicyanato-toluene-6-sulfonate) is purified by crystallization.

Preparation of the Polymer.

Oestradiol - 3 - o - (2.4-dicyanato-toluene-6-sulfonate) is reacted with a mixture of 1.4 - butandiol and glycerine in tetrahydrofuran in presence of triethylendiamine at 50° C for 5 hours. The insoluble polymer is thoroughly washed with methanol and then treated with 1 per cent HCl in methanol at 50° C for a period of 10 hours. By this procedure most of the oestradiol is split off and in the polymer are cavities left with sulfonic acid residues. This polymer can be used for the resolution of racemic mixtures of oestron as well as of oestradiol, obtained by total synthesis of these substances.

EXAMPLE 8

Preparation of mandelic acid (p-hydroxy anilide)-(o-hydroxybenzoate) as a monomer to be polycondensated.

Preparation of the Monomer

Mandelic acid is treated with p- hydroxy - aniline and N,N'-dicycloexylcarbodiimide in tetrahydrofuran at room temperature for 10 hours. The obtained mandelic acid - (p-hydroxy-anilide) is then dissolved in tetrahydrofuran/pyridine 5:1 and treated with salicyclic acid and N,N' - dicyclohexyl-carbodiimide, whereupon in good yields the ester is formed. Mandelic acid -(p-hydroxy-anilide - (o-hydroxy-benzoate) is a stable crystalline compound.

Preparation of the Polymer

Mandelic acid - (p-hydroxy-anilide)- (o-hydroxy-benzoate), phenol and formaldehyde in water are heated with a small amount of oxalic acid for 2 hours at 100° C. After addition of water the resin is separated. After cooling it is crushed and thoroughly mixed with celite, hexamethylene tetramine and magnesium oxide. This product is tempered at 160° C for 10 minutes.

The produced polymer is treated with 20 per cent HCl in methanol for 20 hours under nitrogen at 80° C. Under these conditions the mandelic acid is split off to a high percentage. This polymer can be used for the resolution of D,L-mandelic acid.

Additional Examples of the Introduction of Functional Groups into Polymers in an Arrangement Analogous to Enzymes (A) With only one functional group:

The following two examples (as well as Examples 6 and 7 supra) clearly show that racemate resolution is possible even where only one functional group is introduced. Such resolution is accomplished due to the position of the group in the microcavity and to the shape of the microcavity.

EXAMPLE 9

Preparation of D-1,2- propanediol-(p-vinylphenylboronate) as monomer for the polymerization.

Preparation of the Monomer 1.52 g (0.02 mole) of D-1,1-propanediol was heated to ebullition with 2.96 g (0.02 mole) of p-vinylphenylboric acid in methylene chloride and the water that formed was separated in the water separator. After 2 hours the reaction had ended, the solvent was removed by distillation and the residue was dissolved in petroleum ether. After filtering out the unreacted p-vinylphenylboric acid, the reaction mixture was concentrated again and distilled in vacuo. Yield 2.6 g (70%), BP 57° C at 0.3 mm. $[\alpha]_D^{20} = +16.9°$ ($c = 0.26$, dioxane). $C_9H_{13}BO_2$: Calc.: C 70.29; H 6.93; B 5.75; Found: C 70.27; H 7.00; B 5.71

Preparation of the Polymer

In two batches, 1.54 g (0.008 mole) of D-1,2-propanediol-(p-vinylphenylboronate), 8.19 g (approx.

0.063 mole) of tech. divinylbenzene mixture (55% divinylbenzene) and 100 mg of azoisobutyronitrile were polymerized in 8.9 ml of solvent. The solvent for batch P I was acetonitrile, and for batch P II it was benzene. The polymerization was performed thermally at temperatures increasing from 60° to 120° C. After crushing to 63–125 μ grain diameter, the D-propanediol matrix was split off with a 1:1 mixture of methanol and water by the flow-through method. The cleavage rate amounted to approximately 80–90% for both polymers.

For the determination of the racemate resolving ability, 4.5 g of the polymer prepared was stirred in each case with 500 mg of D,L-1,2-propanediol. Then the mixture was filtered and the absorbed 1,2-propanediol was split off from the polymer again by elution with a 1:1 mixture of methanol and water. The filtrate and the elution solution were concentrated separately and the 1,2-propanediol obtained was transformed in each case to the 1,2-propanediol-di-O-(p-nitrobenzoate) whose rotation was then determined. The racemate resolving ability was judged on the basis of the rotation. The resolution factors α were 1.015 for P I and 1.013 for P II.

EXAMPLE 10

Preparation of D-glyceric acid methyl ester2,3-O-(p-vinylphenylboronate) as monomer for polymerization.

Preparation of the Monomer 7 g (0.058 mole) of D-glyceric acid methyl ester was transformed with 8.6 g (0.058 mole) of p-vinylphenylboric acid to the phenylboronate in the same manner as in the foregoing example.

Purification by distillation at $5 \times 10^{-5}$ Torr. B.P. 109°–112° C. Yield 8.4 g (63%), $[\alpha]_D^{20}$: +58.7° (c = 1.1, dioxane).

NMR (CDCl$_3$): δ 3.70 (s, 3 H of COOCH$_3$), 3 glyceric acid protons, ABM spectrum ($\delta_A$ 4.25, $\delta_B$ 4.48, $I_{AB}$= 8.5 Hz, $I_{AM-BM}$ = 7.5 Hz, $\delta_M$ = 4.92 (t): 3 H of the vinyl group, AMX spectrum ($\delta_A$ 5.22, $I_{AM}$ = 1.5 Hz, $I_{AX}$ = 10.5 Hz, $\delta_M$ 5.70, $I_{MX}$ = 17.5 Hz, $\delta_X$ = 6.65 q) 4 H of the aromatic, A$^2$B$^2$ spectrum ($\delta_A$ 7.72, $\delta_B$ 7.31, $I_{AB}$ = 8.0 Hz).

C$_{12}$H$_{13}$BO$_4$ (232.1): Calc.: C 62.11; H 5.65; B 4.66; Found: C 61.93; H 5.78; B 4.56

Preparation of the Polymer 1.5 g of D-glyceric acid methyl ester -2,3-O-(p-vinylphenylboronate), 9.7 g of tech. divinylbenzene (55% pure), 100 mg of azoisobutyronitrile and 11.2 ml of acetonitrile were polymerized in the usual manner. The matrix was split off again (to about 50%) with a 1:1 mixture of methanol and water. The polymer thus prepared had a resolving factor for D,L-glyceric acid methyl ester of α = 1.030.

B. With Additional Interactions of Polymer Matrix and Matrix

If comonomers are added in the polymerization which are capable of interacting with certain structural parts of the matrix, they arrange themselves in the microcavity during the polymerization such that, after the matrix is cleaved off, they substantially facilitate the specific reattachment of the matrix. Thus the function as an additional adhesion group and considerably increase the specificity of the racemate resolution.

EXAMPLE 11

INTERACTION OF ESTER AND BORIC ESTER GROUP WITH VINYL PYRIDINE

PREPARATION OF THE POLYMER 1.5 g of D-glyceric acid methyl ester-2,3-O-(p-vinylphenylboranate), 5.4 g of glycol dimethacrylate, 4.3 g of m-vinylpyridine, 100 mg of azoisobutyronitrile and 11.2 ml of acetonitrile were polymerized in the usual manner.

The cleavage rate with a 1:1 mixture of methanol and water was 36.7%. The specificity of the racemate resolution for D,L-glyceric acid methyl ester was higher than in Example A2.

EXAMPLE 12

Hydrophobic interaction between two octyl-alcohol moieties in the polymerization of D-glyceric acid-n-octylester-2-3,-O-(p-vinylphenylboronate).

Preparation of the Monomer 10 g (0.095 mole) of D-glyceric acid was heated with 900 ml of n-octanol and 0.5 g of p-toluenesulfonic acid for 1 hour on the water separator, with refluxing. Then the mixture was cooled and 0.5 g of dry potassium acetate was added to inactivate the p-toluenesulfonic acid, and the excess n-octanol was removed by distillation in a water jet vacuum. The residue was distilled at 0.01 Torr and 13 g (62%) was obtained having a BP$_{0.01}$ of 102°–104° C. It was difficult to free this product of n-octanol residues by distillation, so this was accomplished by chromatography on SiO$_2$ with a mixture of benzene, acetone and petroleum ether (60/90) in a ratio of 12:8:3 as the vehicle. The product was D-glyceric acid-n-octylester: $[\alpha]_D^{20}$: + 18.8° (c = 1.1, dioxane) [Literature: BP$_{13}$ 181°–183°, $[\alpha]_D^{19}$: +10.2° ]. The ester prepared in the bomb tube at 145°–155° according to the literature must have contained considerable amounts of n-octanol.

C$_{11}$H$_{22}$O$_4$ (218.3): Calculated: C 60.52; H 10.16; Found: C 60.44; H 10.15

D-glyceric acid-n-octylester-2,3,-O-(p-vinylphenylborenate) was then obtained by the reaction of D-glyceric acid-n-octylester with p-vinylphenylboric acid. Yield 65%, BP 130° C at 10$^{-4}$ Torr. $[\alpha]_D^{20}$: 43.2° (c= 1.0, (dioxane).

C$_{19}$H$_{27}$BO$_4$ (330.2): Calc.: C 69.11; H 8.24; B 3.27; O 19.38; Found: C 68.86; H 8.37; B 3.31; O 19.36

EXAMPLE 13

(Continued)

Preparation of the Polymer 1.5 g of D-glyceric acid-n-octylester-2,3,-O-(p-vinylphenylboronate), 3.85 g of glycoldimethacrylate, 2.95 g of n-octylmethacrylate, 100 mg of azoisobutyronitrile and 8.3 ml of acetonitrile were polymerized as described before. The splitting off of the matrix was performed with 90% ethanol. The specificity for the resolution of the racemic D,L-glyceric acid-n-octylester is markedly greater than in Example 10.

EXAMPLE 14.

Interaction between aromatics in the polymerization of D-glycericacidbenzylester-2,3,-0-)p-vinyl-phenylboronate).

Preparation of the Monomer 32.4 g (0.27 mole) of D-glyceric acid methyl ester was heated with 150 ml of acetone and 0.8 g of p-toluenesulfonic acid in 1300 ml of methylene chloride with refluxing through a column with a water separator until no more water was formed (approx. 14 hours). Then the mixture was cooled to 0° C and washed with a KOH solution (2 g KOH in 120 ml of water) of 0° C, then washed twice with 100 ml each time of water of 0° C, dried with potassium carbonate, and then, after drawing off the solvent, it was distilled in the water jet vacuum. $BP_{12\ mm}$ 77°, yield of 2,3-Q-Isopropylidene-D-glycericacidmethylester 38.0 g (88%) of a colorless, very fluid liquid. $[\alpha]D_{20}$: +8.1° (c = 1.5, acetone). NMR (CDCl$_3$): δ 1.40 and 1.49 (2s, 6 H of the isopylidene group), 3.75 (s, 3 H of the methyl ester protons), the three glyceric acid protons form an ABM system $\delta_A = 4.20$, $\delta_B = 4.00$, $I_{AB} = 8.5$ Hz, $I_{Am=BM} = 6$ Hz, $\delta_M = 4.57$ (t).

$C_7H_{12}O_4$ (160.2): calculated: C52.49; H 7.55; Found: C52.31; H 7.41

14.4 g (0.09 mole) of 2,3-O-isopropulidene-D-glyceric-acidmethylester and 14 g (0.077 mole) of benzyl alcohol (freshly distilled) were heated with 0.4 g (0.002 mole) of aluminum isopripylate, with stirring, in vacuo (12 Torr), for 9 h at 70° C and 4 h at 90° C, while a carbon dioxide-free stream of air was drawn through the solution through a capillary. Then the reaction mixture was distilled in vacuo, producing 16.1 g of 2,3-O-isopropylidene-D-glycericacidbenzyl-ester, $BP_{0.01\ mm}$ 100–103°. Residues of benzyl alcohol were removed by chromatography on silica gel with a vehicle of benzene, acetone and petroleum ether mixed in a ratio of 12:8:3. $[\alpha]_D^{20}$: +14.1° (c = 1.2, dioxane). NMR (CDCl$_3$): δ1.34 and 1.46 (2 s, 6 H of the isopropylidene group), 3 glyceric acid protons, ABM spectrum: $\delta_A$ 3.98, $\delta_B$ 4.16, $I_{AB} = 9$ Hz, $I_{AM=BM} = 6$ Hz, $\delta_M$ 4.51 (t); 5.07 (s, benzyl-CH$_2$), 7.20 (s, 5 aromatic protons).

$C_{13}H_{16}O_4$ (236.3): Calculated: C 66.09; H 6.83; Found: C 66.16; H 6.66

16 g (0.068 mole) of 2,3-O-isopropylidene-D-glyceric-acidbenzylester was hydrolyzed at 50= with 15 g of Amberlyst 15 in 350 ml of dioxane with 1% water for 8 hours. To emove small amounts of free gylceric acid, the mixture was filtered through silica gel with a solvent composed of benzene, acetone and petroleum ether, 12:8:3. Yield of D-glycericacidbenzylester 9.5 g (70%) of an oil which solidified at −10° C. $[\alpha]_D^{20}$: + 18.0° (c = 1.2, dioxane).

$C_{10}H_{12}O_4$ (196.2) Calculated: C 61.22; H 6.16; Found: C 60.73; H 6.01

Preparation of the p-vinylphenylboronate was analogous to the previous examples. Refinement performed by crystallization from petroleum ether 60/90. Yield of D-glycericacidbenzylester-2,3-Q-(p-vinylphenylboronate): 80%, in colorless flakes with a 40° C melting point, $[\alpha]_D^{20}$: +55.7° (c = 1.2, dioxane).

$C_{18}H_{17}BO_4$ (308.2): Calculated: C 70.16; H 5.56; B 3.51; Found: C 69.92; H.5.51; B 3.25

Prepartion of the Polymer 1.5 g of D-glycericacid benzylester-2,3-O-(p-vinylphenylboronate), 7.2 g of tech. divinylbenzene (55% pure), 100 mg of azoisobutyrontrile and 9.5 ml of acetonitrile were polymerized in the usual manner. The splitting off of the matrix was perfomed with 90% ethanol.

The polymer had a good capacity for the resolution of D,L-gylceric acid benzyl ester.

EXAMPLE 15

Electron Donor-Accepter Complexes (charge transfer complexes) in the Polymerization of D-gylcericacid-p-nitrobenzylester-2,3-O-(p-vinylphenylboronate).

Preparation of the Monomer 10 g (0.065 mole) of p-nitrobenzyl alcohol and 7 g (0.044 mole) of 2,3-O-isopropylidene-D-gylcericacid-methylester were first homogenized by heating at 100°. After the addition of 0.4 g (0.002 mole0 of aluminum isopropylate the mixture was heated in vacuo for 1 hour at 110° as described in the case of the benzyl ester. The reaction product was crystallized from a mixture of methanol and water, yielding 9.2 g (55%) of 2,3-O-isopropylidene-D-gyleric acid-p-nitrobenzyl-ester in long, yellow needles having a melting point of 62.5°, $[\alpha]_D^{20}$: +8.5° (c = 0.8, dioxane).

$C_{13}H_{15}NO_6$ (281.3): Calculated: C 55.52; H 5.37; N 4.98; Found: C 55.67; H 5.32; N 5.28

By hydrolysis of the isopropylidene derivative rhombic crystals were obtained in an 84% yield [from a 12:8:3 mixture of benzene, acetone and petroleum ether], of D-glyceric acid-p-nirtobenzylester of MP 57°, $[\alpha]_D^{20}$: + 29.2° (c = 1.0, dioxane). The NMR (DMSO) showed the expected proton ratios.

$C_{10}H_{11}NO_6$ (241.2): Calculated: C 49.80; H 4.59; N 5.81; Found: C 49.59; H 4.94; N 5.50

The p-vinylphenylboronate ws prepared as decribed above. Crystallization from benzene/petroleum ether 60/90° resulted in an 86% yield of D-glycericacid-p-nitrobenzylester-2,3-O-(p-vinylphenylboronate) in the form of colorless needles of MP 99–103° C, $[\alpha]_D^{20}$: + 46.5° (c = 1.1, dioxane). NMR (CDCl$_3$): 6 H of the p-nitrobenzyl radical (δ 5.24, (s, −CH$_2$); H of the aromatic in the form of an AB spectrum, $\delta_A$ 7.41, $\delta_B$ 8.06, $I_{AB} = 8.5$ Hz).

$C_{18}H_{16}BNO_3$ (353.2): Calc.: C 61.22; H 4.57; B 3.06; N 3.97; Found: C 60.84; H 4.53; B 3.51; N 4.00

Preparation of the Polymer 1.5 g pof the monomer, 4.0 g of glycol dimethacrylate, 2.35 g of p-dimethylaminostyrne, 100 ml of azoisobutyronitrile and 7.9 ml of acetontrile were polymerized in the usual manner. As soon as the mixing and polymerization took place there appeared the intense yellow-red coloration of a charge transfer compex, which has not appeared in the previous polymerizations.

The polymer thus prepared has a very good capacity for the resolution of D,L-glycericacid-p-nitrobenzylester.

EXAMPLE 16

Electrostatic Interactions in the Polymerization of D-glycericacid-p-hydroxybenzylester-2,3-O-(p-vinylphenylnoronate).

Preparation of the Polymer 1.5 g of the monomer prepared as specified above from p-hydroxybenzyl alcohol was polymerized with 3.85 g of glycoldimethacrylate, 2.95 g of p-(dimethylaminomethyl)styrene, 100 mg of azoisobutyronitrile and 8.3 ml of acetonitrile. The splitting off of the matrix ws performed with methanol mixed with 0.1N aqueous HCl 1:1. The specificity for the resolution of D,L-glyceric acid-p-hydroxybenzylester is considerably higher than in Example 10 and 14.

EXAMPLE 17

Additional Electrostatic Interactions Between Tertiary Amine and Carboxyl Group in the Polymerization of Ecgonine-3-benzoate-[(p-vinylphenyl)-methyl]-amide

Preparation of the Monomer 2.89 g (0.01 mole) of ecgonine monobenzoate (desoxymethylcocaine) was reacted in the presence of 2.47 g (0.012 mole) of N,N'-dicyclohexylcarnodiimide with 2.4 g (0.02 mole) of p-aminomethylstyrene in 200 ml of tetrahydrofuran. After 8 hours of standing at room temperature, the precipitated urea was removed by filtration and the solution was concentrated. After repeated recrystallization, ecgonine-3-benzoate-[(p-vinylphenyl)-methyl]-amide is obtained in pure form.

Preparation of the Polymer 2 g of the monomer, 0.7 g of methacrylic acid, 7.0 g of technical divinylbenzene (55% pure) and 100 mg of azoisobutyronitrile were polymerized in 9 ml of acetonitrile in the usual manner. The matrix was largely split off by heating in an ampoule at 80° with 20% HCl in methanol.

The polymer contained free amino groups and carboxylic groups and was very well suited for the resolution of the racemic mixture of ecgonine-3-benzoate and 1,2,3,5-isoecgonine-3-benzoate.

Examples of the Introduction of Functional Groups of Modified Reactivity Having the Same Matrix.

In order to introduce into the polymer functional groups of precisely gradated reactivity and mobility, the monomer can either be modified in its structure (see Examples 18–23) or its properties can be modified by chemical reaction in the finished polymer after splitting off the matrix (see Examples 24–25).

EXAMPLE 18

Introduction of an amino group of greater conformative mobility and basicity by the polymerization of D-glycericacid-[2(p-vinylphenyl)]-ethylamide-2,3-O-(p-vinylphenyl)-boronate.

Preparation of the Monomer

Analogously to the previously described preparation of D-glycericacid-p-vinylanilide, 16 g (0.11 mole) of p-(2-aminoethyl)-styrene was reacted by the Boudrousx method with 8.8 g (0.055 mole) of 2,3-O-isopropylidene-D-glyceric acid-methyester to form the amide. The liquid raw product (14 g) was hydrolyzed directly in 660 ml of a 2:1 mixture of dioxane and water with 14 g of Amberlyst 15.

5 g (39%) of D-glycericacid-[2(p-vinylphenyl)-ethylamide was obtained in the form of chromatographically uniform, colorless crystals (recrystallization from chloroform) with a melting point of 129°, $[\alpha]_D^{20}$: +21.2° (c = 1.0, acetone). NMR (acetone-d$_6$ = D$_2$O): $\delta$ 2.78 (t, I = 7 Hz, 2 H of the $\alpha$-CH$_2$), 2.92 (s, 2 H of OH), 3.20–4.20 (m, 5 H of the glyceric acid and the $\beta$-CH$_2$), 3 H of the vinyl group, AMX system $\delta_A$ 5.10 (q, I$_{AM}$ = 1.5 Hz, I$_{AX_2}$ = 10.5 Hz, $\delta_M$ 5.64 (q, I$_{MX}$ = 17.5 Hz) $\delta_X$ 6.66 (q), 4 H of the aromatic, A$^2$B$^2$ system ($\delta_A$ 7.12, $\delta_B$ 7.28, I$_{AB}$ = 8.5 Hz) $\delta$ 7.38 (s, 1 H of the amide proton).

C$_{13}$H$_{17}$NO$_3$ (235.3): Calc.: C 66.36; H 7.28; N 5.95; Found: C 66.20; H 7.37; N 5.80

D-glycericacid-[2-(p-vinylphenyl)]-ethylamide-2,3-O-(p-vinylphenyl)-boronate was obtained by reaction with tri-(p-vinylphenyl)-boroxine in a yield of 73%, colorless crystals (from petroleum ether 60/90) of MP 138–139° C $[\alpha]_D^{20}$: +66.1° (c = 1.0, acetone).

C$_{21}$H$_{22}$BNO$_3$ (347.2): Calc.: C 72.64; H 6.38; B 3.12; N 4.03; Found: C 72.23; H 6.50; B 3.44; N 4.09

Preparation of the Polymer 1.5 g of the above described monomer was polymerized with 7.2 g of technical divinylbenzene (55% pure), and 100 mg of azoisobutyronitrile in 9.5 ml of acetonitrile. After crushing, and cleaving off the matrix with 20% methanolic HCl at 100° in the bomb tube, a polymer was obtained containing phenylboric acid groups and $\beta$-phenylethylamine groups. The polymer had a good capacity for the resolution of D,L-glyceric acid.

EXAMPLE 19.

Introduction of a $\beta$-Phenylethylboric Acid Group and an Aniline Group by Polymerization of D-glycericacid-(p-vinylanilide)-2,3-O-[2-(p-vinylphenyl)]-ethylboronate.

Preparation of the Monomer

To prepare 2-(p-vinylphenyl)-ethylboric acid, 4,5 g (0.187 mole) of magnesium chips were activated with 5 ml of ethylbromide in 10 ml of dry THF at room temperature and under N$_2$ for a short time. The supernatant solution was removed, 20 ml of THF was added, and 24 g (0.118 mole) of p-($\beta$-bromoethyl)-styrene in 100 ml of THF was added drop by drop such that the solvent was barely boiling (approx. 20 minutes). Thereafter the mixture was allowed to continue to react and then it was chilled to −78° C. This Grignard solution was added in portions to a solution, also chilled to −78°, of 27 g (0.117 mole) of tri-n-butylborate in 60 ml of dry ether. The mixture was allowed to warm up to room temperature overnight, with stirring, and was poured into an ammonium chloride solution (250 g NH$_4$Cl in 750 ml of water) of 0° C temperature. The organic phase was separated and the aqueous removed by shaking three times with 100 ml of ether. After the addition of 0.1 g of tert. butylcatechol, the organic phase was concentrated; 100 ml of water was added and the mixture was concentrated by evaporation in vacuo at 30°, this operation being performed four times to remove the n-butanol azeotropically. The residue was treated four times with water at 80°, the main part of the insoluble polymer was removed by filtration, and crystallization was produced at 0° C. Yield: 2.5 g (12.5%) colorless crystals, MP 75° C. If dried under CaCl$_2$ in the vacuum exsiccator to form the boroxine, polymerization took place. Consequently the product was suction dried in an air stream. NMR (methanol-d$_4$): In addition to the protons of the vinylphenyl radical, $\delta$ 1.08 was obtained (t, I = 7 Hz, —CH$_2$—B, signal broadened due to partial esterification with methanol), 2.17 (t, I = 7 Hz, Ar—CH$_2$—), H of OH at $\delta$ 4.70.

C$_{10}$H$_{13}$BO$_2$ (175.2): Calc.: C 68.54; H 7.48; B 6.17; Found: C 68.27; H 7.63; B 5.99

D-glyceric acid-(p-vinylanilide)-2,3-O-[2-(p-vinylphenyl)]ethylboranate was obtained from D-glycericacid-(p-vinylanilide) and 2-(p-vinylphenyl)-ethylboricacid in a yield of 48%, MP 79–80° C (from petroleum ether 60/90) $[\alpha]_D^{20}$: +38.0° (c = 1.0, acetone).

$C_{21}H_{22}BNO_3$ (347.2): Calc.: C 72.64; H 6.38; B 3.12; N 4.03; Found: C 72.35; H 6.30; B 3.21; N 4.19

Preparation of the Polymer

The polymer was prepared similarly to Example 18. A polymer containing free aniline groups and β-phenylethylboric acid groups was obtained. The polymer had the ability to resolve D,L-glyceric acid.

EXAMPLE 20.

Introduction of β-Phenylethylboric Acid Groups and β-Phenylethylamine Groups by the Polymerization of D-Glycericacid-[2-(p-vinylphenyl)]-ethylamide-2,3-O-[2-(p-vinylphenyl)]ethylboranate.

Preparation of the Monomer

D-Glycericacid-[2-(p-vinylphenyl)]-ethylamide-2,3-O-2-(p-vinylphenyl)]-ethylboronate was obtained from D-glycericacid-[2-(p-vinylphenyl)]-ethylamide and 2-(p-vinylphenyl)-ethylboric acid in a yield of 90% MP 81° (from petroleum ether 60/90), $[\alpha]_D^{20}$: +15.9° (c = 1.0, acetone).

$C_{28}H_{26}BNO_3$ (375.3): Calc.: C 73.61; H 6.98; B 2.88; N 3.73;
Found: C 73.75; H 7.09; B 2.24; N 3.49

Preparation of the Polymer

This was performed analogously to Example 18. After cleaving off the matrix, a polymer was obtained having free β-phenylethylamine groups and β-phenylethylboric acid groups. The polymer had an ability to resolve D,L-glyceric acid.

EXAMPLE 21.

Introduction of Optically Active α-Phenylethylamine Groups by Polymerization of D-Glycericacid-[D-1-(p-vinylphenyl)]-ethylamide-2,3-O-(p-vinylphenyl)-boronate.

Preparation of the Monomer

The amide was prepared analogously to the previously described preparation of D-glycericacid-p-vinylanilide from 16 g (0.11 mole) of D-p-(1-aminoethyl)-styrene and 8.8 g (0.055 mole) of 2,3-O-isopropylidene-D-glycericacidmethylester by condensation by the Boudroux method and splitting off the isopropylidene group. An easily crystallizing substance is obtained, which was then reacted with p-vinylphenylboric acid to form the monomer of the title in good yields.

Preparation of the Polymer

The polymer was prepared analogously to Example 18. After cleaving off the matrix, a polymer was obtained having phenylboric acid groupings and optically active D-α-phenylethylamine groupings. The ability to resolve racemates was greatly improved with respect to Examples 1 and 19 by the introduction of the chiral phenylethylamine group.

EXAMPLE 22

Introduction of an Indenboric Acid Grouping and an Aniline Grouping by the Polymerization of D-Glycericacid-(p-vinylanilide)-2,3-0-(6-indenylboronate).

Preparation of the Monommer

6-Indeneboric acid was obtained in the manner described in the case of 2-(p-vinylphenyl)-ethylboric acid (Example C 2) from 6-boromoindene and tri-n-butylborate, by means of a Grignard reaction. MP 165° (with decomposition).

This was then reacted with D-glycericacid-(p-vinylanilide) to form the desired monomer.

Preparation of the Polymer

The polymerization of the monomers was performed analogously to Example 18. After splitting off the matrix a polymer was obtained having aniline groupings and indeneboric acid groupings. This boric acid has a poorer conformative mobility than the phenylboric acid grouping. The polymer had a capacity for the resolution of D,L-glyceric acid.

EXAMPLE 23

Introduction of an Aniline Grouping and of a Boric Acid Grouping Whose Free Rotation is Impeded. Through the Polymerization of D-Glycericacid-(P-vinylanilide)-2,3-O - (4,6-dimethyl-7-indenylboranate).

Preparation of the Monomer

A solution of 127 g (1 mole) of β-chloropropionyl chloride in 70 ml of methylene chloride is added drop by drop, with stirring and cooling with an ice bath, to a suspension of 152 g of aluminum chloride in 250 ml of distilled methylene chloride. Then, at room temperature, a solution g (180 g (0.97 mole) of 1-bromo-2,4-dimethyl- benzene in 80 ml of methylene chloride is added drop by drop. The reaction was completed at room temperature in 72 hours. The reaction mixture was hydrolyzed on ice, the phases were separated, the aqueous ones were again extracted with methylene chloride, and the combined organic phases were dried over $Na_2SO_4$. After concentration of the solvent by evaporation, an oily brown crude product was obtained, which was purified by distillation. $BP_{0.2\ mm}$ 105.5° C, yield of 1-(3-chloropropionyl)-2,4-dimethyl-5-bromobenzene: 230 g (83.5%).

138.4 g (0.5 mole) of this product was added in portions, with stirring, to 400 ml of concentrated sulfuric acid. The reaction mixture was maintained for 35 minutes at a temperature of 125° C and then hydrolyzed on ice. The precipitating solid was suction filtered, washed neutral with water, and then dried in a current of air. The crude product was refined by extraction with petroleum ether in a Soxhlet apparatus.

After removal of the solvent by distillation, an orange-colored, powdery product is obtained, MP 103°, yield 78.9 g (65.5%) of 4-bromo-5,7-dimethylindanone.

The ketone was reduced with 7.1 g of $LiAlH_4$ in 750 ml of ether. The suspension mixture was refluxed for 2-½ hours and then hydrolyzed on ice. After separation of the phases the aqueous phase was extracted several times with ether. The combined ether phases were dried over $Na_2SO_4$. After concentration, 4-bromo-5,7-dimethylindanole was obtained by recrystallization from petroleum ether, MP °, yield 43.45 g(93%).

Water is split off from this by heating 20 g (0.0822 mole) with 3 g of $KHSO_4$ and 0.1 g of tert. butylcatechol for 15 minutes at 120°.

Refinement by distillation. BP 78° (0.15 Torr), MP 34°, yield 11.5 g (62%) of 7-bromo-4,6-dimethylindene.

From this, 4,6-dimethyl-7-indenylboric acid was obtained in the manner described in the case of 2-(p-vinylphenyl)- ethylboric acid (Example C 2) by reaction to form a Grignard compound, followed by reaction with tri-n-butylborate. This compound was able to be reacted in the usual manner with D-glycericacid-(p-vinylanilide) to form the desired monomer.

Preparation of the Polymer

The polymerization was performed analogously to Example 18. After splitting off the matrix a polymer was obtained which contained free indeneboric acid groups and aniline groups. The boric acid was impeded in its free rotation and therefore was capaple to a special degree of achieving a specific orientation of the added-on glyceric acid in the cavity. Its capacity for the resolution of D,L-glyceric acid is therefore particularly good.

EXAMPLE 24.

Transformation of primary amino groups introduced into the polymer to tertiary amino groups. In this manner a greater basicity is achieved, on the one hand, and on the other hand, interaction with a carboxylic acid is limited to an electrostatic one (formation of amides impossible).

Preparation of the Polymer

One gram of each of the amino-group-containing polymers prepared in Examples 1, 4, 5, 18, 19, 20, 21, 22 and 23 was mixed with 7.2 g of 88% formic acid. 10.2 grams of 36% formaldehyde solution was added with ice cooling and the mixture was stirred for 30 minutes. Then the mixture was melted in the bomb tube under $N_2$ and the tube was shaken for 24 h at 70°. Then the polymer was filtered out, washed with a large amount of 1:4 water and methanol mixture, and dried in vacuo at 50° C.

By this method the main part of the free $NH_2$ groups were transformed to $-N(CH_3)_2$ groups. The boric acid groupings were preserved. The ability of the polymers to resolve D,L-glyceric acid was greater than that of the starting polymers.

EXAMPLE 25.

Transformation of the Tertiary Amines Introduced into the Polymer to Quaternary Amines. In this manner greater basicity is achieved.

Preparation of the Polymer

One gram of each of the polymers prepared in Example 24 was heated for 6 hours at 40° in 10 ml of acetonitrile with 1 ml of $CH_3I$ under $N_2$. In this manner the quaternary compounds $-{}^{30}(CH_3)_3I^-$ were obtained, which could be converted with dilute lye to the corresponding hydroxides $-{}^{30}(CH_3)_3OH^-$. These compounds have a good capacity to resolve D,L-glyceric acid.

Introduction of Functional Groups into Polymers by Means of Achiral Matrices

EXAMPLE 26.

Introduction of Two Amino Groups at Specific Intervals by Polymerization of Dicarboxylic Acid Diamides.

Preparation of the Monomers 0.78 g of succinic acid dichloride, for example, was added drop by drop, with vigorous stirring, to a solution of 1.2 g of p-aminostyrene and 3.5 ml of distilled pyridine in 400 ml of dry ether. Precipitation took place immediately. After 6 h of stirring filtration was performed. The residue was carefully washed with dilute HCl, water, $NaHCO_3$ solution, and again water, and was recrystallized from a large amount of acetone. A 70% yield of succinicacid-di-(p-vinylanilide) was obtained in the form of fine needles melting at 235° with decomposition.

NMR spectrum (DMSO): $\delta$ 9.38 (2 H of NH), $\delta$ 7.6–7.2 8 H of the aromatic, 6 H of the vinyl group in the form of an AMX spectrum ($\delta_A$ 5.08, $\delta_M$ 5.62, $\delta_X$ 6.58, $I_{AM} = 1.5$ Hz, $I_{AX} = 10.5$ Hz, $I_{MX} = 17$ Hz), $\delta$ 3.25 (4 H of $CH_2$).

Mass spectrum: m/e 320 $^+$), 119.43.

$c_{20}H_{20}N_2O_2$ (320): Calc.: C 74.98; H 6.29; N 8.74; Found: C 74.45; H 6.21; N 8.60 p-Aminomethylstyrene was also used instead of p-amino-styrene and succinic acid di-[(p-vinylphenyl)-methyl]- amide was obtained in crystalline form in this manner.

With these two amine components (p-aminostyrene and p-aminomethylstyrene), the corresponding diamides were prepared from the following acids: oxalic acid, malonic acid, succinic acid, adipic acid, phthalic acid, terephthalic acid, 4,4'-diphenic acid.

Preparation of the Polymers 3 g of the monomer was polymerized in the usual manner with 14 g of technical divinylbenzene (55% pure), 200 mg of azoisobutyronitrile and 19 ml of acetonitrile. The splitting off of the matrix was performed with 20% HCl in methanol at 80° C in the bomb tube.

In each case polymers were obtained having free amino groups, two of them located at a specific distance from one another. The distance between the amino groups is as follows for the derivative of each particular acid:

| | |
|---|---|
| Oxalic acid | approx. 3.8 Å |
| Malonic acid | approx. 4.7 Å |
| Succinic acid | approx. 6.0 Å |
| Adipic acid | approx. 8.6 Å |
| Phthalic acid | approx. 5.4 Å |
| Terephthalic acid | approx. 7.2 Å |
| 4,4'-Diphenic acid | approx. 11.2 Å |

As in Examples 24 and 25 these primary amino groups were also converted to tertiary or quaternary amino groups. In the high-pressure fluid chromatography performed with adsorbents on this basis it was found that the dicarboxylic acid used as the matrix in each case had higher retention volumes that dicarboxylic acids in which there was a greater or lesser spacing between the functional groups.

EXAMPLE 27

Introduction of Three Amino Groups in a Defined Spatial Relationship to One Another by Polymerization of Tricarballylic Acid Tri-[(p-vinylphenyl)-methyl]-amide.

Preparation of the Monomer

In the manner described in Example 26, tricarballylic acid was transformed via the acid chloride to the triamide with [(p-vinylphenyl)-methyl]-amine.

Preparation of the Polymer 3 grams of tricarballylicacid-tri-[(p-vinylphenyl)-methyl]-amide were polymerized in the usual manner with 14 g of technical divinylbenzene (55% pure), 200 mg of azoisobutyronitrile and 19 ml of acetonitrile. The matrix was split off with 20% HCl in methanol at 80° in the bomb tube.

Polymers were obtained having free amino groups of which three in each case were in an established relationship of adjacency to one another.

EXAMPLE 28

Introduction of Two Carboxyl Groups into a Polymer at a Specific Interval by Polymerization of Diol-dimethacrylates.

Preparation of the Polymer

In each case 1.5 g of the dimethacrylic acid ester of ethyleneglycol, of 1,4-butanediol, of 1,6-hexanediol and of hydroquinone was polymerized with 7 g of technical divinylbenzene (55% pure), 100 mg of azoisobutyronitrile and 8.5 ml of acetonitrile in the usual manner. The matrix was split off with 20% HCl in methanol at 80° in the bomb tube. The polymers thus prepared contained free carboxyl groups, two of them being present in a microcavity at a specific distance from one another. In the high-pressure fluid chromatography using adsorbents on this basis it was found that diamines or diols of the same number of carbon atoms as the matrix have substantially higher retention volumes than those of a smaller or larger number of carbon atoms.

EXAMPLE 29

Introduction of a Carboxyl Group and of an Amino Group into the Polymer at a Specific Distance From One Another by Polymerizing ε-Methacrylaminocapronicacid-[(p-vinylphenyl)-methyl]-amide.

Preparation of the Monomer 8.5 g of methacrylic acid chloride was added drop by drop 10 g of ε-aminocaproic acid methyl ester in the presence of 30 ml of pyridine in 500 ml of ether. After processing in the usual manner (see Example 26), easily crystallizing ε-methacrylaminocapronic acid methyl ester was obtained. By the previously described method of Boudroux (Example 1), this ester was reacted with [(p-vinylphenyl)-methyl]-amine to form the monomer of the title.

Preparation of the Polymer 3 g of the monomer was polymerized in the usual manner with 7 g of technical divinylbenzene (55% pure), 100 mg of azoisobutyronitrile and 8.5 ml of acetonitrile. The matrix was split off with 20% HCl in methanol at 80° in the bomb tube.

A polymer was obtained having one amino group and one carboxyl group in a microcavity at a specific distance apart.

Examples of the Introduction of Functional Groups by Means of a Variety of Chiral Matrix Molecules

EXAMPLE 30

Preparation of a Sugar Racemate Resolving Polymer by Polymerization of Methyl-α-D-mannopyranoside-2,3,4,6-di-(p-vinylphenylboronate)

Preparation of the Monomer 4 g of methyl-α-D-mannopyranoside and 6 g of p-vinylphenylboric acid were heated in 500 ml of dry dioxane in the presence of 0.1 g of tertiary butylcatechol with slow distillation, until the boiling temperature of pure dioxane (101° C) was reached (4 hours). After concentration in vacuo, the residue was dissolved in benzene, filtered to remove undissolved substances, and again concentrated. Crystallization from petroleum ether (40/60) gave the monomer of the title in colorless crystals, MP 137 –138°, $[\alpha]_D^{25}$ = 180.6°, $[\alpha]_{436}^{25}$ = −436.4° ($c$ = 1.0, chloroform).

$C_{24}H_{24}B_2O_6$: Calc.: C 66.09; H 5.74; B 5.17; Foud: C 65.57; H 5.79; B 4.67

Preparation of the Polymer

The monomer was polymerized by two different method:

(a) 2 g of monomer, 4 ml of ethyleneglycoldimethacrylate, 4 ml of methacrylate and 100 mg of azoisobutyronitrile in 8 ml of acetonitrile were polymerized in the usual manner. The matrix was split off with a 4:1 mixture of water and methanol, the cleavage being about 80% complete. The polymer had a racemate resolving ability of α = 1.16 for methyl-α-D,L-mannopyranoside.

(b) In a second batch, 2 g of monomer was polymerized radiochemically with 7 g of technical divinylbenzene (55% pure) in 8 ml of acetonitrile. For this purpose the sealed ampoule was exposed for 6 hours to a radiation of $1 \times 10^8$ rads from a cobalt-60 source of 16,000 Curies. In this manner, polymerization, chemical crosslinking and additional radiochemical crosslinking of the reaction mixture was accomplished. A mechanically very stable, macroporous polymer was obtained which, after the splitting off of the matrix, had a very good racemate resolving ability.

EXAMPLE 31

Introduction of Three Different Functional Groups by the Polymerization of N-(p-vinylbenzylidene)-3',4'-dihydroxy-L-phenylalanine-(p-vinylanilide)-3',4'-O-(6-indenylboranate).

Preparation of the Monomer 1 gram of 3',4'-di-O-trifluoracetoxy-N-trifluoroacetyl-L-phenylalanine was converted to the acid chloride with 10 ml of thionyl chloride, and, after the excess $SO_2Cl_2$ had been distilled off, was dissolved in 20 ml of benzene. To this solution of 1.2 g of p-aminostyrene in 20 ml of benzene was slowly added, drop by drop. A white precipitate settled out. The mixture was refluxed for one more hour and the solvent was removed by distillation at reduced pressure. The crude product was washed carefully with water several times and then recrystallized from aqueous ethanol solution. The 3',4'-di-O-trifluoracetoxy-N-trifluoracetyl-L-phenylalanine-(p-vinylanilide) was obtained in colorless crystals.

Then the trifluoracetyl radicals were split off by allowing 1 g of the product to stand for 48 hours in 50 ml of 0.2N NaOH in 90% ethanol. This reaction was performed under nitrogen gas with stirring. After neutralization of the solution it was concentrated and the residue was recrystallized.

1 gram of 3',4'-dihydroxy-L-phenylalanine-(p-vinylanilide) was suspended in 10 ml of 2N NaOH and chilled to 0° C. 1.5 g of p-vinylbenzaldehyde was slowly added, drop by drop, with stirring. After 6 hours of stirring, the newly formed precipitate was removed by filtration and refined by recrystallization, to produce a good yield of N-(p-vinylbenzylidene)-3',4'-dihydroxy-L-phenylalanine-(p-vinylanilide).

1 gram of this compound was dissolved in 300 ml of dioxane and warmed under a weak vacuum with 360 mg of 6-indenylboric acid such that the solution boiled weakly at 45° C and the water that formed was withdrawn azeotropically. Then the mixture was concentrated and the concentrate was recrystallized to produce the monomer of the title.

Preparation of the Polymer 2 grams of the above-described polymer polymer were polymerized with 7 grams of technical divinylbenzene (55% pure) and 100 mg of azoisobutyronitrile in 9.5 ml of acetonitrile, in the usual manner. The matrix was split off with 20% methanolic HCl at 100° C in the bomb tube. A polymer was obtained having microcavities which contained one free amino, aldehyde and boric acid grouping each.

The polymer had a very good ability to resolve 3',4'-dihydroxy-D,L-phenylalanine.

It is to be realized that the above examples exemplify the invention and are not intended to be limitative as one can substitute for the D-glyceric acid, another optically active organic compound. Similarly, for each of the polymerizable residues bonded to such D-glyceric acid there can be substituted another polymerizable or polycondensable residue.

What is claimed is:

1. A method of separating an optically active antipode from a racemate thereof which comprises contacting said racemate with a three-dimensional polymeric material comprising a polymer of an olefinically unsaturated compound or a polycondensation polymer having in its physical configuration a void whose size and shape and the arrangement of the functional groups therein correspond to the size and shape and the arrangement of the functional groups of an optically active compound, said polymeric material being operative to preferentially sorb an optically active compound whose size and shape correspond to said void when a racemate mixture thereof is passed over the three-dimensional polymeric material wherein the void of such polymeric material corresponds to the size and shape of the optically active antipode to be separated from said racemate.

2. Method according to claim 1 wherein said racemate is DL-glycericacid and the void in said polymeric material corresponds in size and shape to D-glycericacid.

3. Method according to claim 1 wherein the racemate is D-L-glycericacid methylester and the void in said polymeric material corresponds in size and shape to D-glycericacid.

4. Method according to claim 1 wherein the racemate is D-L-glycericaldehyde and the void in the said polymeric material corresponds in size and shape to D-glycericacid.

5. Method according to claim 1 wherein the racemate is D-L-mannitol and the void in the polymeric material corresponds in size and shape to D-mannitol.

* * * * *

UNITED STATES PATENT AND TRADEMARK OFFICE
CERTIFICATE OF CORRECTION

PATENT NO. : 4,127,730
DATED : November 28, 1978
INVENTOR(S) : WULFF et al.

It is certified that error appears in the above-identified patent and that said Letters Patent are hereby corrected as shown below:

Column 11, line 29, "(1602)" should read -- (160.2) --.

Column 11, line 62, "89%" should read -- 85% --.

Column 11, line 64, after "H 6.95" insert -- N 5.60 --.

Column 13, line 38, "83" should read -- 183 --.

Column 16, line 18, "100'" should read -- 100 = --.

Column 24, line 45, "100 ml" should read -- 100 mg --.

Column 29, line 49, "$\_^{30}(CH_3)_3I$" should read -- $\_N^+(CH_3)_3I^-$ --.

Column 29, line 51, "$\_^{30}(CH_3)_3OH$" should read -- $\_N^+(CH_3)_3OH^-$ --.

Column 30, line 11, "320$^+$)" should read -- 320 (M$^+$) --.

Signed and Sealed this

Twelfth Day of June 1979

[SEAL]

Attest:

RUTH C. MASON
*Attesting Officer*

DONALD W. BANNER
*Commissioner of Patents and Trademarks*